US008489583B2

(12) United States Patent
Phillips et al.

(10) Patent No.: US 8,489,583 B2
(45) Date of Patent: Jul. 16, 2013

(54) TECHNIQUES FOR RETRIEVING DOCUMENTS USING AN IMAGE CAPTURE DEVICE

(75) Inventors: Daja Phillips, Palo Alto, CA (US); Kurt Piersol, Campbell, CA (US); Gregory Wolff, Redwood City, CA (US)

(73) Assignee: Ricoh Company, Ltd., Tokyo (JP)

( * ) Notice: Subject to any disclaimer, the term of this patent is extended or adjusted under 35 U.S.C. 154(b) by 206 days.

(21) Appl. No.: 10/957,080

(22) Filed: Oct. 1, 2004

(65) Prior Publication Data
US 2006/0085477 A1    Apr. 20, 2006

(51) Int. Cl.
*G06F 7/00* (2006.01)
*G06F 17/30* (2006.01)

(52) U.S. Cl.
USPC ............................................. 707/723; 707/772

(58) Field of Classification Search
USPC ................ 707/3, 772, 724, 729, 723; 348/61, 348/211.2; 455/403; 382/229
See application file for complete search history.

(56) References Cited

U.S. PATENT DOCUMENTS

| 5,392,447 | A |   | 2/1995  | Schlack et al. |
|-----------|---|---|---------|----------------|
| 5,806,005 | A |   | 9/1998  | Hull et al. |
| 5,999,915 | A |   | 12/1999 | Nahan et al. |
| 6,009,459 | A |   | 12/1999 | Belfiore et al. |
| 6,026,388 | A | * | 2/2000  | Liddy et al. ........................ 707/1 |
| 6,078,914 | A |   | 6/2000  | Redfern |
| 6,338,059 | B1 | * | 1/2002 | Fields et al. .................. 715/208 |
| 6,457,047 | B1 |   | 9/2002 | Chandra et al. |
| 6,611,862 | B2 |   | 8/2003 | Reisman |
| 6,785,670 | B1 | * | 8/2004 | Chiang et al. ................. 707/706 |
| 7,236,632 | B2 |   | 6/2007 | Erol et al. |
| 7,251,689 | B2 |   | 7/2007 | Wesley |
| 8,332,401 | B2 |   | 12/2012 | Hull et al. |
| 8,335,789 | B2 |   | 12/2012 | Hull et al. |
| 2001/0016067 | A1 | * | 8/2001 | Evans .......................... 382/176 |
| 2002/0073236 | A1 |   | 6/2002 | Helgeson et al. |
| 2002/0102966 | A1 | * | 8/2002 | Lev et al. ...................... 455/412 |
| 2003/0028522 | A1 | * | 2/2003 | Collins-Thompson et al. .. 707/3 |
| 2003/0187886 | A1 | * | 10/2003 | Hull et al. .................... 707/203 |
| 2004/0017482 | A1 | * | 1/2004 | Weitman .................. 348/207.99 |
| 2004/0133582 | A1 | * | 7/2004 | Howard et al. ............... 707/100 |

(Continued)

FOREIGN PATENT DOCUMENTS

| EP | 1 555 626 A2 | 7/2005 |
|----|--------------|--------|
| EP | 1 662 064 A1 | 5/2006 |

(Continued)

OTHER PUBLICATIONS

Mukherjea, Sougata et al., "AMORE: A World Wide Web image retrieval engine", 1999, C&C Research Laboratories, NEC USA Inc., Baltzer Science Publishers BV, pp. 115-132.*

(Continued)

*Primary Examiner* — James E Richardson
(74) *Attorney, Agent, or Firm* — Kilpatrick Townsend & Stockton, LLP

(57) ABSTRACT

Embodiments of the present invention provide techniques for retrieving electronic documents based upon images captured using an image capture device. One or more images captured by a user using an image capture device are used to search a set of documents to retrieve one or more documents that match the search query. The one or more documents retrieved by the search may then be provided to the user or some other recipient.

31 Claims, 8 Drawing Sheets

U.S. PATENT DOCUMENTS

| | | | |
|---|---|---|---|
| 2004/0260680 A1* | 12/2004 | Best et al. | 707/3 |
| 2004/0267734 A1* | 12/2004 | Toshima | 707/3 |
| 2005/0086205 A1* | 4/2005 | Franciosa et al. | 707/3 |
| 2005/0165747 A1* | 7/2005 | Bargeron et al. | 707/3 |
| 2005/0185060 A1* | 8/2005 | Neven, Sr. | 348/211.2 |
| 2005/0223030 A1 | 10/2005 | Morris et al. | |
| 2005/0289182 A1* | 12/2005 | Pandian et al. | 707/104.1 |
| 2006/0012677 A1* | 1/2006 | Neven et al. | 348/61 |
| 2006/0029296 A1* | 2/2006 | King et al. | 382/313 |
| 2006/0031216 A1* | 2/2006 | Semple et al. | 707/4 |
| 2006/0262352 A1 | 11/2006 | Hull et al. | |
| 2006/0262962 A1 | 11/2006 | Hull et al. | |
| 2006/0262976 A1 | 11/2006 | Hart et al. | |
| 2006/0285172 A1 | 12/2006 | Hull et al. | |
| 2006/0285772 A1 | 12/2006 | Hull et al. | |
| 2010/0166309 A1 | 7/2010 | Hull et al. | |

FOREIGN PATENT DOCUMENTS

| | | |
|---|---|---|
| JP | 10-228468 A | 8/1998 |
| JP | 2000-16545 A | 6/2000 |
| WO | WO 99/05658 A1 | 2/1999 |

OTHER PUBLICATIONS

"Mobile Search Engines", 2002, Sonera MediaLab, pp. 1-12.*

Lu, Yue et al., "Document retrieval from compressed images", Nov. 27, 2001, Department of Computer Science, School of Computing, National University of Singapore, Elsevier Science Ltd., pp. 987-996.*

Veltkamp, Remco et al., "Content-Based Image Retrieval Systems: A Survey", Oct. 28, 2002, Department of Computing Science, Utrecht University, pp. 1-62.*

Esposito et al.; "Machine Learning Methods for Automatically Processing Historical Documents: From Paper Acquisition to XML Transformation," Proceedings of the First International Workshop on Document Image Analysis for Libraries (Dial '04), IEEE, 2004, pp. 108.

U.S. Appl. No. 10/813,901, filed Mar. 20, 2004, Erol et al.

Brassil et al., "Hiding Information in Document Images," AT&T Bell Laboratories, Murray Hill, NJ.

European Search Report, European Application No. 07252397, Oct. 15, 2007, 7 pages.

Ho et al., "Decision Combination in Multiple Classifier Systems," *IEEE Trans. Pattern Analysis and Machine Intelligence*, 16(1):66-75 (1994).

Hull, J. J., "Document Image Skew Detection: Survey and Annotated Bibliography," pp. 40-64 from *Document Analysis Systems II*, S. L. Taylor, eds., published by World Scientific (1998).

Hull, J. J., "Document Image Similarity and Equivalence Detection," *IJDAR*, pp. 37-42 (1998).

Khoubyari et al., "Font and Function on Word Identification on Document Recognition," *Computer Vision and Image Understanding*, 63(1): 66-74 (Jan. 1996).

Kopec et al., "Document Image Decoding Using Markov Source Models," *IEEE Trans. Pattern Analysis and Machine Intelligence*, 16(6):602-617 (1994).

McDonald, G., "Third Voice: Invisible Web Graffiti," *PC World*, May 18, 1999, (online),downloaded from http://www.pcworld.com/news/article/0,aid,11016,00.asp on Nov. 14, 2006.

PCT International Search Report and Written Opinion, PCT/JP2006/316810, Oct. 10, 2006, 9 pages.

PCT International Search Report and Written Opinion, PCT/JP2006/316811, Oct. 10, 2006, 9 pages.

PCT International Search Report and Written Opinion, PCT/JP2006/316812, Oct. 10, 2006, 9 pages.

PCT International Search Report and Written Opinion, PCT/JP2006/316814, Oct. 10, 2006, 11 pages.

Non-Final Office Action for U.S. Appl. No. 13/106,796 mailed on Nov. 22, 2011, 33 pages.

Non-Final Office Action for U.S. Appl. No. 11/461,300 mailed on Nov. 28, 2012, 22 pages.

* cited by examiner

TECHNIQUES FOR RETRIEVING DOCUMENTS USING AN IMAGE CAPTURE DEVICE

BACKGROUND OF THE INVENTION

The present invention relates to document retrieval techniques, and more particularly to techniques for retrieving electronic documents based upon images captured using an image capture device.

The use of image capture devices such as cameras, mobile phones equipped with cameras, etc. has seen widespread use in recent times. For example, mobile phone cameras are becoming ubiquitous in many parts of the world. Image capture devices such as mobile phones are also becoming powerful computing engines in their own rights with significant storage capacity, ability to run powerful productivity software, wireless networking capabilities, and the like. The existence and emergence of such image capture devices suggests new applications for information input and document retrieval.

BRIEF SUMMARY OF THE INVENTION

Embodiments of the present invention provide techniques for retrieving electronic documents based upon images captured using an image capture device. Examples of image capture devices include cameras (both film-based and digital), mobile phones, personal data assistants (PDAs), laptops, other portable devices, scanners, etc. equipped with image capture capabilities. One or more images captured by a user using an image capture device are used to search a set of electronic documents to retrieve one or more electronic documents corresponding to the captured image. The one or more retrieved documents may then be provided to the user or some other recipient.

According to an embodiment of the present invention, techniques are provided for retrieving electronic documents. An image captured using an image capture device is received. Contents of the image are extracted. A search query is formed based upon the extracted contents. A plurality of electronic documents is searched to identify a first electronic document that satisfies the search query.

According to another embodiment of the present invention, techniques are provided for retrieving electronic documents. A first image captured using an image capture device is received. Contents of the first image are extracted. A search query is formed based upon the extracted contents of the first image. A search is performed to identify a first set of electronic documents comprising one or more electronic documents that satisfy the search query. It is determined if the first set of electronic documents comprises a predefined number of electronic documents. A second image is requested if the first set of electronic documents does not comprise the predefined number of electronic documents. Contents of the second image are extracted. A search query is formed based upon the extracted contents of the second image. A search is performed to identify a second set of electronic documents comprising one or more electronic documents that satisfy the search query based upon the extracted contents of the second image.

According to yet another embodiment of the present invention, techniques are provided for retrieving electronic documents in which a first image captured by using an image capture device is received. Contents of the first image are extracted. A search query is formed based upon the extracted contents of the first image. A search is performed using the search query formed based upon the extracted contents of the first image. (a) Another image is requested if the search does not identify at least one electronic document. (b) Another image is received. (c) Contents of the another image are extracted. (d) A search query is formed based upon the extracted contents of the another image. (e) A search is performed using the search query formed based upon the extracted contents of the another image. (a), (b), (c), (d), and (e) are repeated until the search identifies at least one electronic document that satisfies the search query.

According to yet another embodiment of the present invention, techniques are provided for retrieving electronic documents in which an image captured using an image capture device is received. A plurality of text patterns are extracted from the image using an image processing technique. A subset of text patterns from the plurality of text patterns are selected such that the plurality of text patterns comprises at least one text pattern that is not included in the subset. A search query is formed based upon the subset of text patterns. A plurality of electronic documents is searched to identify a first electronic document that satisfies the search query.

According to yet another embodiment of the present invention, techniques are provided for retrieving electronic documents in which an image captured using an image capture device is received. A plurality of text patterns are extracted from the image using an image processing technique. A first subset of text patterns is selected from the plurality of text patterns such that the plurality of text patterns comprises at least one text pattern that is not included in the first subset. A search query is formed based upon the first subset of text patterns. A plurality of electronic documents is searched to identify a first electronic document that satisfies the search query. A search is performed using the search query formed based upon the first subset of text patterns. A second subset of text patterns is selected from the plurality of text patterns if the search performed using the first subset of text patterns does not identify at least one electronic document. A search query is formed based upon the second subset of text patterns. A search is performed using the search query formed based upon the second subset of text patterns.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for retrieving electronic documents based upon images captured using an image capture device. Examples of image capture devices include cameras (both film-based and digital), mobile phones equipped with a camera, personal data assistants (PDAs) with image capture capabilities, laptops, scanners, and the like. In general, an image capture device may be any device that is capable of capturing an image. One or more images captured by a user using an image capture device are used to search a set of electronically stored documents ("electronic documents") to retrieve one or more documents corresponding to the captured image. The one or more documents retrieved for the captured image may then be provided to the user or some other recipient.

Figure 1:
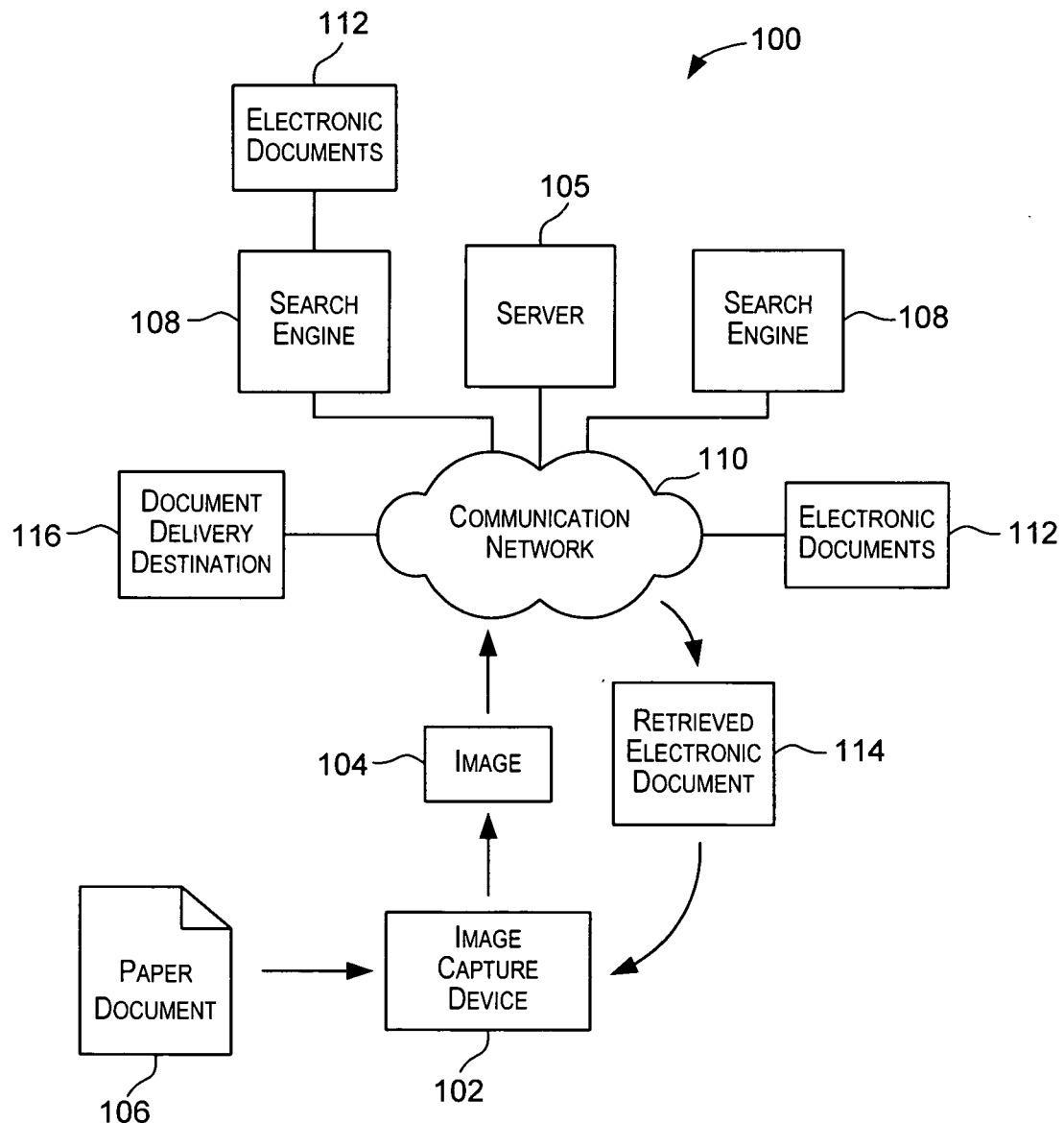
FIG. 1 is a simplified block diagram of a system that may incorporate an embodiment of the present invention.

FIG. 1 is a simplified block diagram of a system 100 that may incorporate an embodiment of the present invention. FIG. 1 is merely illustrative of an embodiment incorporating the present invention and does not limit the scope of the invention as recited in the claims. One of ordinary skill in the art would recognize other variations, modifications, and alternatives.

A user may use an image capture device 102 to capture an image 104. As shown in FIG. 1, the user may capture an image 104 of a page (or partial page) of a paper document 106. Paper document 106 may be any document printed on a paper medium. Examples of image capture device 102 include a camera, a mobile phone equipped with image capture capabilities, and the like. The captured image 104 may be of the entire contents of the paper document or a portion thereof. It should be apparent that other types of images such as images of scenes, objects, etc. may also be captured using image capture device 102 and used in accordance with the teachings of the present invention.

In one embodiment, image capture device 102 may be configured to process image 104, form a search query based upon image 104, and perform a search using a search engine 108 to find one or more electronic documents satisfying the search query. The search query may be communicated to a search engine 108 via communication network 110. In an alternative embodiment, part of the processing may be performed by another server or system 105. For example, as shown in FIG. 1, image capture device 102 may communicate image 104 to server 105 via communication network 110. Server 105 may be configured to process image 104, form a search query based upon image 104, and perform a search using a search engine 108 to find one or more electronic documents satisfying the search query.

Communication network 110 may be a local area network (LAN), a wide area network (WAN), a wireless network, an Intranet, the Internet, a private network, a public network, a switched network, or any other suitable communication network. Communication network 110 may comprise many interconnected systems and communication links such as hardwire links, optical links, satellite or other wireless communications links, wave propagation links, or any other mechanisms for communication of information. Various communication protocols may be used to facilitate communication of information via communication network 110, including TCP/IP, HTTP protocols, extensible markup language (XML), wireless application protocol (WAP), protocols under development by industry standard organizations, vendor-specific protocols, customized protocols, and others. Images might be transmitted in any of a number of standard file formats, such as JPEG, GIF, PNG, TIFF, JPEG 2000, and the like.

For example, in one embodiment, communication network 110 may be a wireless network. A user may capture an image 104 using a mobile phone camera. The image may then be processed by the mobile phone camera to form a search query and the search query may be communicated to a search engine 108 (or to a server 105 that uses services of a search engine) via the wireless network. In some embodiments, multiple images captured by image capture device 102 may be communicated to a server 105.

One or more search engines 108 may be available for performing the search. A search engine 108 may receive a search query from image capture device 102 or from server 105 and search a set of electronic documents 112 to identify one or more electronic documents that satisfy the search query. One or more search engines 108 may perform the search in collaboration. Search engine 108 may be configured to search electronic documents 112 that are accessible to the search engine either directly or via communication network 110. For example, a search engine 108 may be configured to search electronic documents (e.g., web pages) provided by content providers and available via the Internet. The searched documents may also include documents prepared and stored for an entity such as a corporation, office, school government organization, etc. Examples of a search engine include Google™ search engine, search engines provided by entities such as businesses, companies, etc., Yahoo™ search engine, and others.

One or more electronic documents identified by search engine 108 as satisfying or matching the search query may then be provided to the user or some other recipient. In one embodiment, the documents retrieved from the search may be communicated to the image capture device that was used to capture the image used as input for the search. For example, as shown in FIG. 1, an electronic document 114 identified by search engine 108 may be wirelessly communicated to image capture device 102. The retrieved electronic document 114 may then be output to the user via an application (e.g., a browser, a word processing application) executing on image capture device 102.

The electronic document retrieved from the search may also be provided to the user by communicating it to some destination (e.g., document delivery destination 116 depicted in FIG. 1) other than the image capture device. For example, the retrieved document may be sent via email to the user's inbox or email address. In a similar manner, various destinations and distribution channels may be used to provide the retrieved document to the user. The retrieved document may be communicated to the user in various different formats such as a web page, HTML format, Adobe PDF file, Microsoft Word document, etc. The retrieved electronic document may also be provided to other recipients such as other persons, systems, applications, etc.

Figure 2:
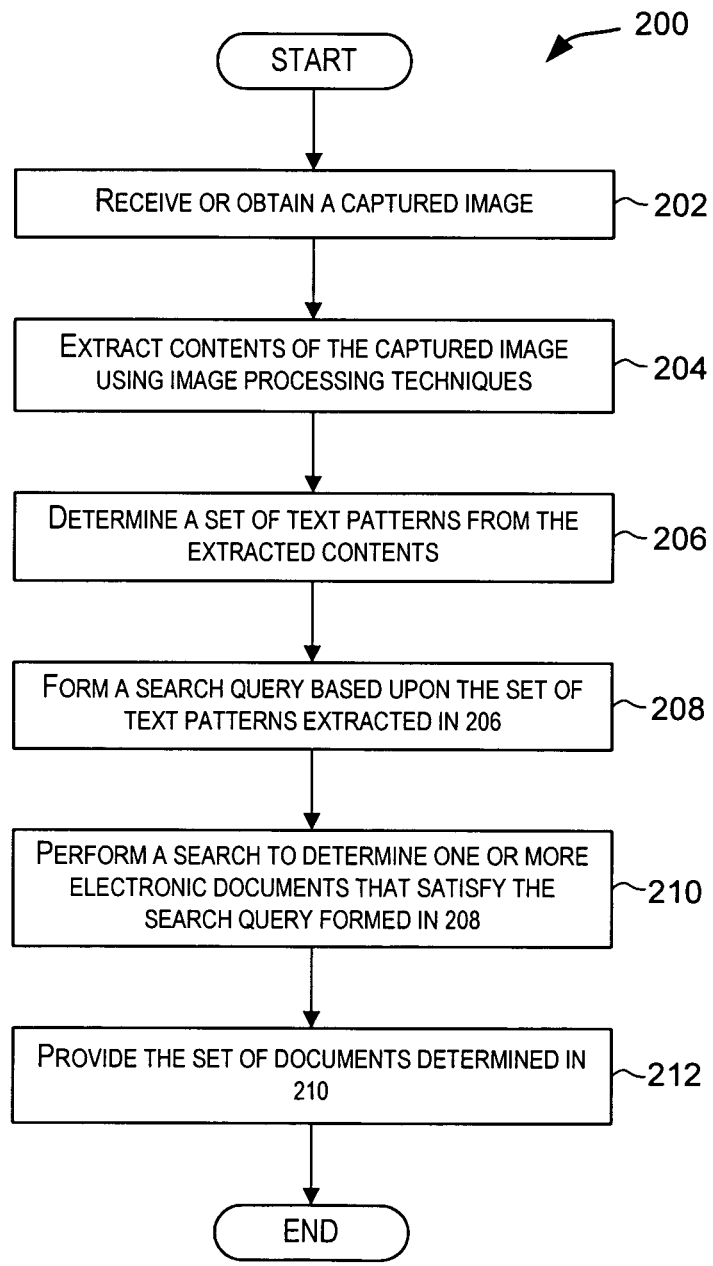
FIG. 2 is a simplified high-level flowchart depicting a method of retrieving an electronic document based upon a captured image according to an embodiment of the present invention.

FIG. 2 is a simplified high-level flowchart 200 depicting a method of retrieving an electronic document based upon a captured image according to an embodiment of the present invention. The method depicted in FIG. 2 may be performed by software code modules or instructions executed by a processor, hardware modules, or combinations thereof. Flowchart 200 depicted in FIG. 2 is merely illustrative of an embodiment of the present invention and is not intended to limit the scope of the present invention. Other variations, modifications, and alternatives are also within the scope of the present invention. The method depicted in FIG. 2 may be adapted to work with different implementation constraints.

As depicted in FIG. 2, processing is initiated upon receiving or obtaining a captured image (step 202). The resolution and quality of the image may vary depending on the image capture device used to capture the image and the quality of the subject matter whose image is captured. Different image capture devices may be used to capture the image.

Contents (or portions thereof) of the captured image are then extracted by applying one or more image processing techniques (step 204). The extracted contents may include text patterns (e.g., words, phrases), image objects, and other objects. In one embodiment, optical character recognition (OCR) techniques are used to extract characters from the captured image.

A set of text patterns are then determined from the contents extracted in step 204 (step 206). The text patterns may be words or phrases. In one embodiment, each text line extracted from the contents of the image is treated as a text pattern. Various techniques may be used to determine the text patterns. In one embodiment, a word filter may be applied to the OCR results received in 204, rejecting any characters or words or marks that are not found in a lexicon (e.g., the English language dictionary). In this manner, punctuations, illegible marks, invalid words, etc. that may have been extracted in step 204 are excluded or filtered out. In some embodiments, steps 204 and 206 may be combined into a single step whereby text patterns are extracted from the captured image.

A search query is then formed based upon the set of text patterns determined in 206 (step 208). In one embodiment, the search query is formed by conjoining the text patterns determined in 206. For example, the text patterns may be conjoined using the Boolean "and" operation (or set intersection operation). In other embodiments, as described below in further detail, a subset of the text patterns obtained in 206 may be included in the search query.

A search is then performed using the search query formed in 208 to identify electronic documents that satisfy the search query (step 210). For a search query formed by conjoining multiple text patterns, a document satisfies the search query if it includes all of the text patterns. An electronic document satisfies a search query if it satisfies all the conditions and terms of the search query. One or more search engines may be used to perform the search in step 210 using the search query. Various different types of search engines may be used to perform the search such as Google™ and the like. The set of documents that is searched may also vary depending upon the search engine used. The set of documents determined in 210 may comprise one or more electronic documents. Alternatively, no documents may be returned by the search if none of the documents in the searched set of electronic documents satisfies the search query.

The set of documents retrieved from the search in 210 is then provided to a recipient (step 212). The recipient may be a person, a system, an application, or some other entity. Various techniques may be used for providing the set of documents to the recipient. For example, the set of documents may be communicated to a user of the image capture device that was used to capture the image received in 202. Various different techniques may be used to provide the retrieved set of documents to the user. In one embodiment, the retrieved documents may be communicated to the image capture device used by the user to capture the image that was used as the input for the search. The retrieved electronic documents may then be output to the user using an application (e.g., a browser, a word processing application, etc.) executing on the image capture device. The retrieved set of documents may also be provided to the user by delivering the documents to some destination other than the image capture device. For example, an email comprising the retrieved set of documents may be sent to the inbox or email address of the user. Various other destinations and delivery channels may be used for providing the documents retrieved from the search. The destinations and delivery techniques may be user-configurable.

The processing depicted in FIG. 2 may be performed automatically upon receiving an image. In one embodiment, the image capture device may be used to capture the image and communicate the image to a server that performs subsequent processing. The server may be configured to process the image, form a search query, and use a search engine to identify documents that satisfy the search query. In other embodiments, the image capture device may have sufficient computing prowess to perform some or all of the processing steps depicted in FIG. 2. For example, in addition to capturing the image, the image capture device may be configured to apply OCR techniques to extract image contents, determine a set of text patterns, form a search query based upon the text patterns, and then use a search engine to find electronic documents that satisfy the search query. The electronic documents identified by the search engine may then be communicated to the image capture device or to some other destination. Accordingly, depending on the processing prowess of the image capture device, the processing depicted in FIG. 2 may be performed by the image capture device and/or a server.

Figure 3:
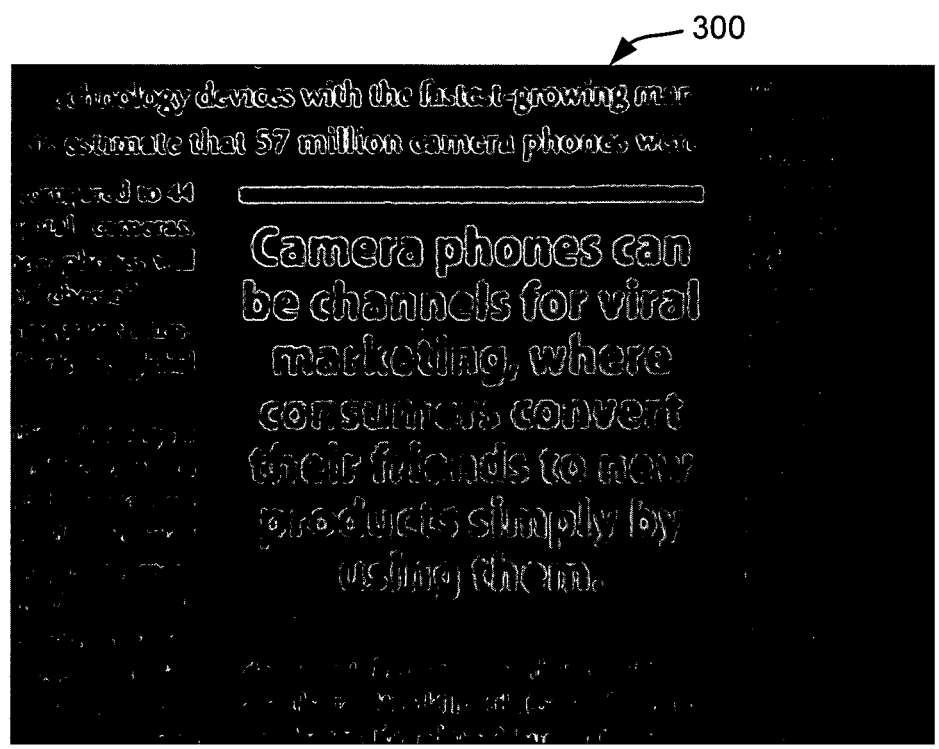
FIG. 3 is an example of an image captured by an image capture device that may be used as input for document retrieval according to an embodiment of the present invention.

The processing depicted in FIG. 2 may be illustrated with the following example. Assume that image 300 depicted in FIG. 3 is received as input for the search. Image 300 is a binarized image that may have been captured using an image capture device such as a mobile phone camera. As can be seen from FIG. 3, image 300 is of low quality, and only a few words can be picked out. The output of OCR applied to image 300 may look as following:

```
~,~. r~ . . . Camera phones can
~"~ . . . be channels for viral
,~,: . . . marketing, where ~,~ ,.~
consumers convert
~,,,,,~ . . . their friends to new
```

Applying a word filter to the OCR output, each line may yield the following phrases (text patterns):
"camera phones can"
"be channels for viral"
"marketing where"
"consumers convert"
"their friends to new"

A search query may then be formed by conjoining all the text patterns. The search query may look as follows:
"camera phones can" AND "be channels for viral" AND "marketing where" AND
"consumers convert" AND "their friends to new"

The search query may then be provided to a search engine such as Google™ to retrieve a set of electronic documents that satisfy the search query. The retrieved set of electronic documents may then be provided to the user.

It is possible in certain instances that no documents are retrieved by applying the search query. This may occur because the corpus of documents searched did not include a document containing the search terms. If the image provided for the search is of such poor quality that text patterns cannot be accurately extracted from the image, the extracted text patterns may be inaccurate and thus result in an inaccurate search query. In order to compensate for errors that may occur due to poor image quality or inadequate image processing techniques that are used to extract contents from the image, a feedback loop may be provided to enable the user to provide additional information for the search to increase the chances of finding a matching document.

Figure 4:
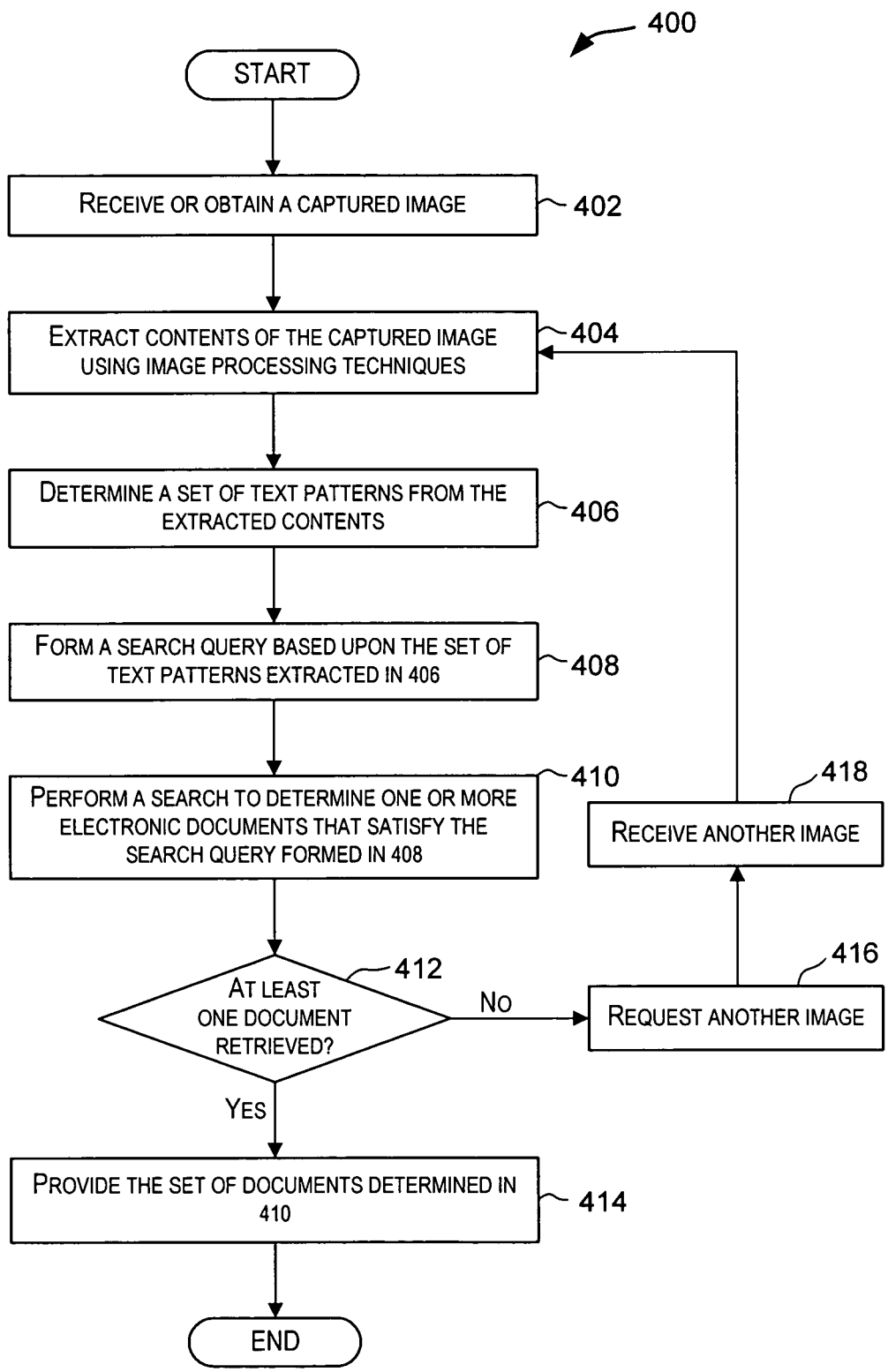
FIG. 4 is a simplified high-level flowchart depicting a method of retrieving an electronic document based upon a captured image and including a feedback loop according to an embodiment of the present invention.

FIG. 4 is a simplified high-level flowchart 400 depicting a method of retrieving an electronic document based upon a captured image and including a feedback loop according to an embodiment of the present invention. The method depicted in FIG. 4 may be performed by software code modules or instructions executed by a processor, hardware modules, or combinations thereof. Flowchart 400 depicted in FIG. 4 is merely illustrative of an embodiment of the present invention and is not intended to limit the scope of the present invention. Other variations, modifications, and alternatives are also within the scope of the present invention. The method depicted in FIG. 4 may be adapted to work with different implementation constraints. The processing depicted in FIG. 4 may be performed by the image capture device and/or a server using a search engine.

As depicted in FIG. 4, processing is initiated upon receiving or obtaining a captured image (step 402). One or more image processing techniques such as OCR techniques are then applied to the captured image to extract contents (or portions thereof) of the captured image (step 404). A set of text patterns is then determined from the contents extracted in step 404 (step 406). A search query is formed based upon the text patterns determined in 406 (step 408). A search is then performed using the search query formed in 408 (step 410). The processing depicted in steps 402, 404, 406, 408, and 410 of FIG. 4 is similar to the processing depicted in steps 202, 204, 206, 208, and 210 of FIG. 2 and described above.

After a set of electronic documents has been retrieved by running a search using the search query, a check is made to see if at least one document is retrieved as a result of the search (i.e., at least one hit for the search query) (step 412). If it is determined in 412 that at least one document is included in the retrieved set of documents, then the set of retrieved documents may be provided to a recipient (step 414). The recipient may be a person, a system, an application, or some other entity. Various techniques may be used for providing the set of documents to the recipient. For example, the set of documents may be communicated to a user of the image capture device that was used to capture the image received in 402. Various techniques may be used to provide the set of documents to the user.

On the other hand, if it is determined in 412 that not even one electronic document was retrieved by the search, then the user is requested to provide another image to be used as input for the search (step 416). After another image is obtained (step 418), processing then continues with step 404 using the new image obtained in 418. A new search is then performed based upon the newly obtained image. In this manner a feedback loop is provided whereby the user can provide additional images for the search. The feedback loop may be repeated until at least one electronic document is identified by the search.

The additional images may be images of the same content as the original image or of different content. For example, if the first image was of a portion of a page from an article printed on a paper document, the second image provided may be an image of another section of the article or even of the same portion as the first image but captured such that the image quality of the second image is better than the first image.

As described above, in certain instances it is possible that the set of documents retrieved from applying the search query may contain multiple documents (i.e., multiple hits). This may be inconvenient to the user especially if the retrieved set comprises several documents. A feedback loop may be provided to enable the user to provide additional information that can be used to reduce the number of electronic documents that are retrieved.

Figure 5:
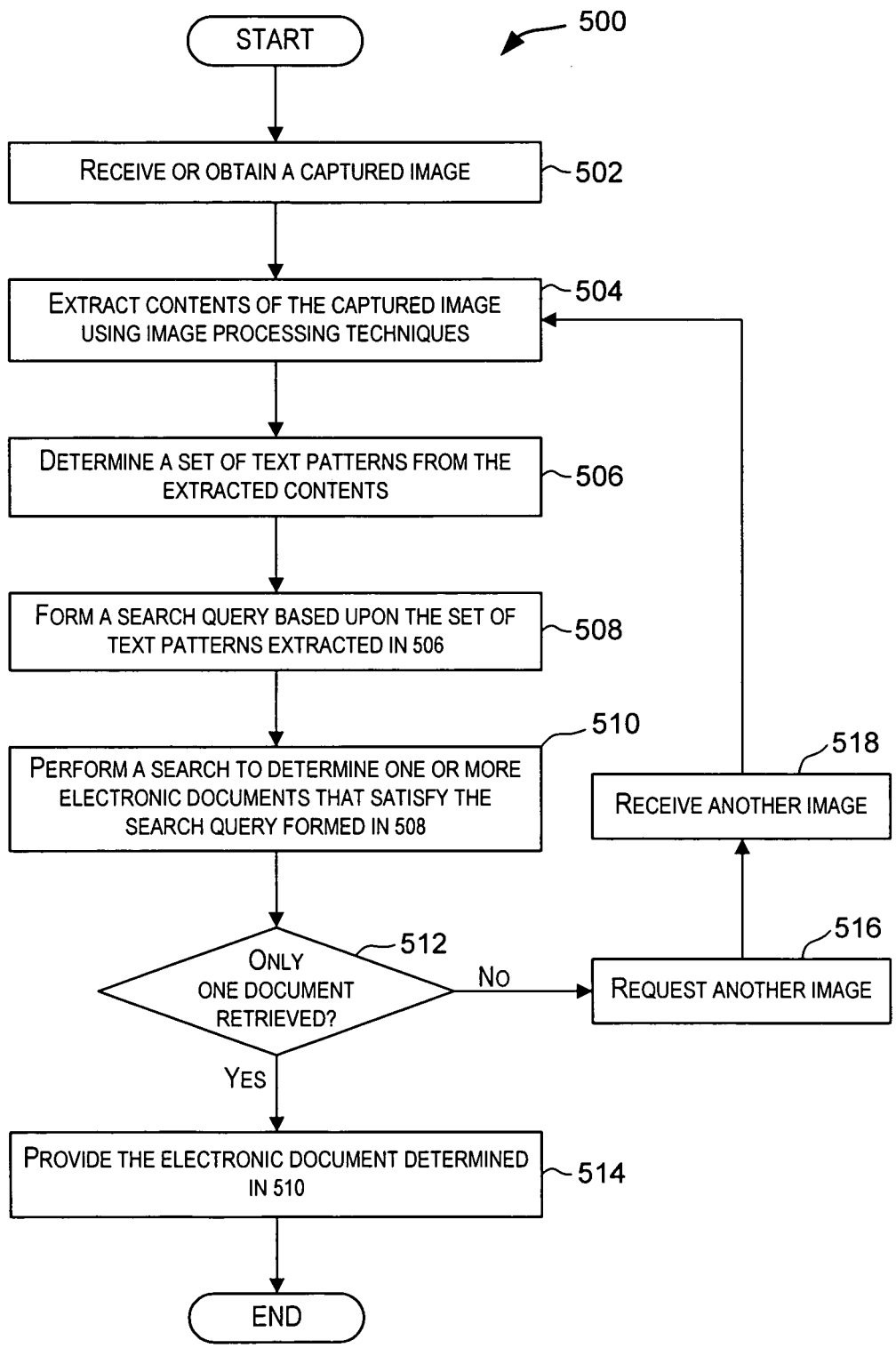
FIG. 5 is a simplified high-level flowchart depicting a method of retrieving an electronic document based upon a captured image and including a feedback loop for reducing the number of retrieved documents according to an embodiment of the present invention.

FIG. 5 is a simplified high-level flowchart 500 depicting a method of retrieving an electronic document based upon a captured image and including a feedback loop for reducing the number of retrieved documents according to an embodiment of the present invention. The method depicted in FIG. 5 may be performed by software code modules or instructions executed by a processor, hardware modules, or combinations thereof. Flowchart 500 depicted in FIG. 5 is merely illustrative of an embodiment of the present invention and is not intended to limit the scope of the present invention. Other variations, modifications, and alternatives are also within the scope of the present invention. The method depicted in FIG. 5 may be adapted to work with different implementation constraints. The processing depicted in FIG. 5 may be performed by the image capture device and/or a server using a search engine.

As depicted in FIG. 5, processing is initiated upon receiving or obtaining a captured image (step 502). One or more image processing techniques such as OCR techniques are then applied to the captured image to extract contents (or portions thereof) of the captured image (step 504). A set of text patterns is then determined from the contents extracted in step 504 (step 506). A search query is formed based upon the text patterns determined in 506 (step 508). A search is then performed using the search query formed in 508 (step 510). The processing depicted in steps 502, 504, 506, 508, and 510 of FIG. 5 is similar to the processing depicted in steps 202, 204, 206, 208, and 210 of FIG. 2 and described above.

After a set of electronic documents has been retrieved from the search using the search query, a check is made to see if the retrieved set of electronic documents comprises precisely one document (i.e., exactly one hit for the search query) (step 512). If it is determined in 512 that only one document is returned by the search, then the one document is provided to a recipient (step 514). The recipient may be a person, a system, an application, or some other entity. Various techniques may be used for providing the electronic document to the recipient. For example, the electronic document may be communicated to a user of the image capture device that was used to capture the image received in 502. Various techniques may be used to provide the electronic document to the user.

On the other hand, if it is determined in 512 that multiple electronic documents are retrieved in response to the search then the user is requested to provide another image to be used as input for the search in order to reduce the number of retrieved documents (step 516). After another image is obtained (step 518), processing then continues with step 504 using the new image obtained in 516. Text patterns from the new image are obtained in 506. A new search query is formed in 508 based upon the newly obtained image. In one embodiment, in 508, the previously applied search query is augmented with the text patterns extracted from the image obtained in 516 (or the search query is formed using some combination of text patterns extracted from the previous image and the new image). In this manner, a new and potentially more precise search query is formed in 508. The augmented search query is then executed in 510. The processing is repeated until only one electronic document is returned in response to the search query. In another embodiment, in 508, a new search query is formed based solely upon the text patterns extracted from the newly received image in 518 (i.e., the previous search patterns are not used). The new search query formed in 508 is then executed in 510.

In this manner, a feedback loop is provided whereby the user can provide additional information in the form of additional images to narrow down the number of electronic documents in the retrieved set of documents. The additional images may be images of different content than the previous image or even same content. For example, if the first image was of a portion of a page from an article printed on paper, the second image provided may be an image of another section of the article. In flowchart 500 depicted in FIG. 5 and described above, a threshold of one document is used for the check performed in 512. In alternative embodiments, the check may be performed using some predefined threshold number which may be user-configurable.

A variety of search engines may be used for performing the search. Many search engines however limit the number of terms or patterns that can be used at a time in a search query. Google™, for instance, has cut off the number of search terms in a query at ten words, having decided that this number is sufficient to uniquely identify a document within their database. As described above, several text patterns (e.g., more than 10) may be extracted from an image of sufficient resolution. However, it may not be possible to use all the extracted text patterns in a search query if the search engine limits the number of terms in a query. To compensate for this situation, several pattern/term selection techniques may be used to select a subset of text patterns to be used for the search. Further, even if the number of terms in a search query is not limited, the selection techniques may be used to select terms that improve the accuracy and reliability of the search. The selection techniques may also be used to reduce the number of documents in the retrieved set of documents.

Figure 6:
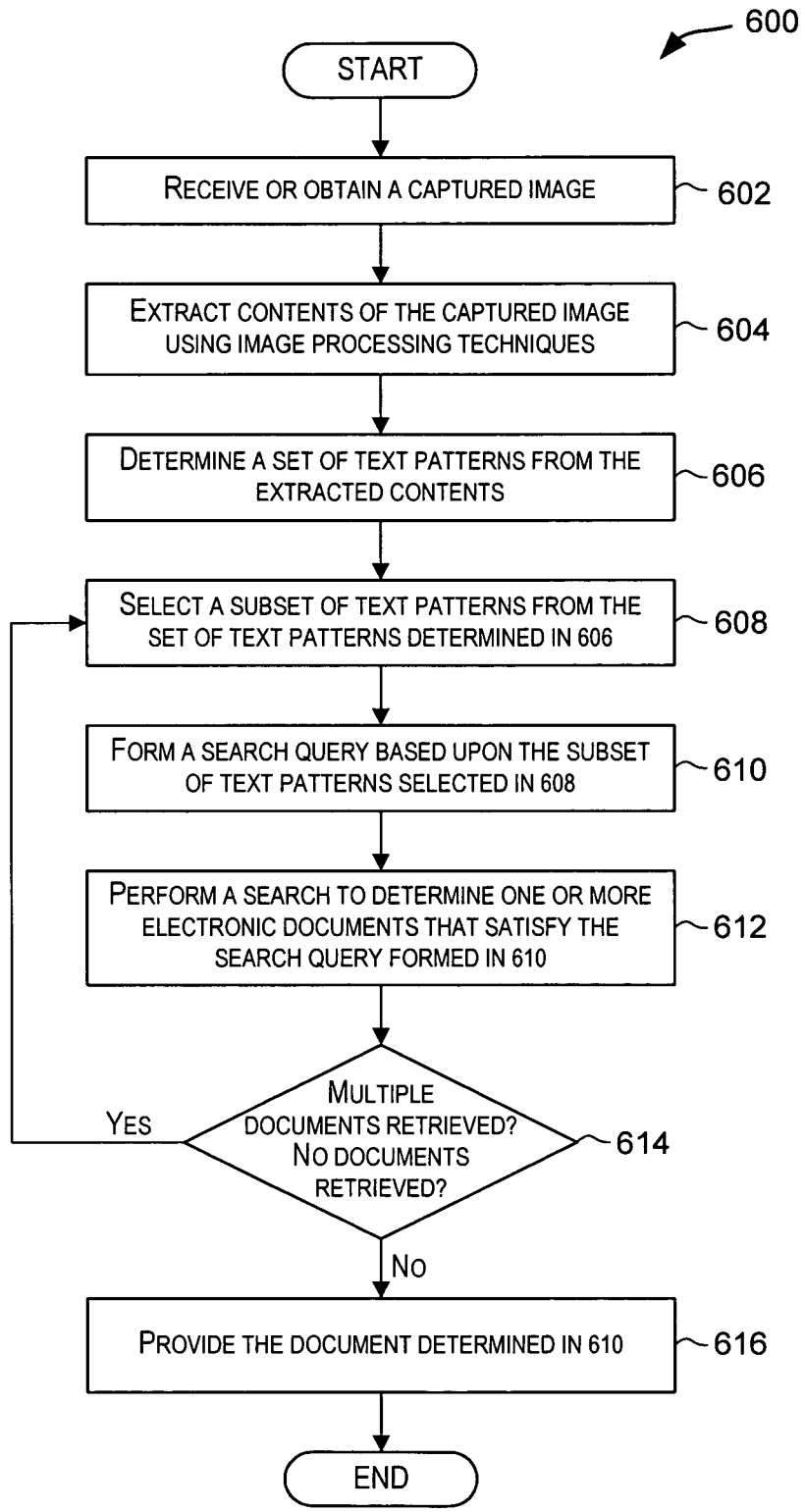
FIG. 6 is a simplified high-level flowchart depicting a method of retrieving an electronic document based upon a captured image using a subset of the extracted text patterns according to an embodiment of the present invention.

FIG. 6 is a simplified high-level flowchart 600 depicting a method of retrieving an electronic document based upon a captured image using a subset of the extracted text patterns according to an embodiment of the present invention. The method depicted in FIG. 6 may be performed by software code modules or instructions executed by a processor, hardware modules, or combinations thereof. Flowchart 600 depicted in FIG. 6 is merely illustrative of an embodiment of the present invention and is not intended to limit the scope of the present invention. Other variations, modifications, and alternatives are also within the scope of the present invention. The method depicted in FIG. 6 may be adapted to work with different implementation constraints. The processing depicted in FIG. 6 may be performed by the image capture device and/or a server using a search engine.

As depicted in FIG. 6, processing is initiated upon receiving or obtaining a captured image (step 602). One or more image processing techniques such as OCR techniques are then applied to the captured image to extract contents (or portions thereof) of the captured image (step 604). A set of text patterns is then determined from the contents extracted in step 604 (step 606).

A subset of text patterns is then selected from the set of text patterns determined in 606 (step 608). The number of text patterns included in the subset is less than the number of text patterns in the set determined in 606 (i.e., the set of text patterns determined in 606 includes at least one text pattern that is not included in the subset). Various different techniques may be used to select text patterns to be included in the subset in 608. The text patterns to be included in the subset may be selected based upon various attributes of or associated with the text patterns. According to a first technique, the text patterns to be included in the subset may be randomly selected from the set of text patterns determined in 606. According to another technique, text patterns may be selected based upon their length. For example, text patterns with longer lengths may be selected prior to text patterns with shorter lengths. Geometric patterns may also be used to select the text patterns to be included in the subset.

According to another technique, text patterns may be selected based upon confidence data associated with the text patterns. In this embodiment, the image processing technique (e.g., an OCR engine) applied in 604 may be configured to associate confidence data with each of the extracted text patterns. The confidence data of a text pattern is a measure of the likelihood that the image processing technique used to extract the text patterns has achieved a correct conclusion as to the content of the text pattern. Various factors may influence the confidence data assigned for a text pattern. For instance, an image processing program might note that the image data was extremely noisy, and lower its confidence value for the text patterns extracted from the image data. As another example, the image processing technique might note that the included characters of a text pattern include the lowercase letter "l", which is notoriously difficult to visually distinguish from the digit "1", and thus the confidence data associated with that text pattern may be lowered. Based upon the confidence data, text patterns with high recognition confidence data are selected first to be included in the subset determined in 608.

A search query is then formed based upon the subset of text patterns determined in 608 (step 610). In one embodiment, the search query is formed by conjoining the text patterns determined in 608. A search is then performed to identify electronic documents that satisfy the search query formed in 610 (step 612).

A check is then made to see if the set of electronic documents retrieved from the search comprises precisely one document (i.e., exactly one hit for the search query) (this number is user-configurable) or, if no document was retrieved by the search (i.e., the search did not yield any match) (step 614). If it is determined in 614 that only one document is included in the retrieved set of documents, then the one electronic document is provided to a recipient (step 616) and processing terminates. The recipient may be a person, a system, an application, or some other entity. Various techniques may be used for providing the electronic document to the recipient. For example, electronic document may be communicated to a user of the image capture device that was used to capture the image received in 602. Various techniques may be used to provide the electronic document to the user.

On the other hand, if it is determined in 614 either that multiple electronic documents are retrieved by the search or no document is retrieved then processing continues with step

608 wherein another subset of text patterns from the set of text patterns determined in 606 is determined. The text patterns in the newly selected subset may be different from the text patterns in the previously selected subset (there may however be overlaps between the subsets). For example, if text patterns with the highest confidence data were selected during the first pass of the processing, then in the second pass, the next set of text patterns based upon confidence data may be selected. Various other selection techniques may also be used.

Processing then continues with step 610 using the subset determined in 608. In this manner, the search may be iteratively performed using text patterns from the set of text patterns determined in 606. Each iteration may use a different subset of text patterns for the search. Such an iterative approach provides several advantages including reducing the number of times that a user has to re-shoot an image when either a match cannot be obtained or when too many matches are obtained. The processing is repeated until only one electronic document is returned in response to the search query.

In specific embodiments of the present invention, the processing depicted in FIG. 6 may be performed only when the number of text patterns extracted from the contents of the image is more that the number of terms allowed in a search query by the search engine used for performing the search. For example, a check may be made prior to step 608 to determine if the number of extracted text patterns exceeds the number of search terms allowed by the search engine. In this embodiment, a subset of text patterns may be selected only upon determining that the number of extracted text patterns exceeds the allowed number of search terms, else all the extracted text patterns may be used in the search query.

Figure 7:
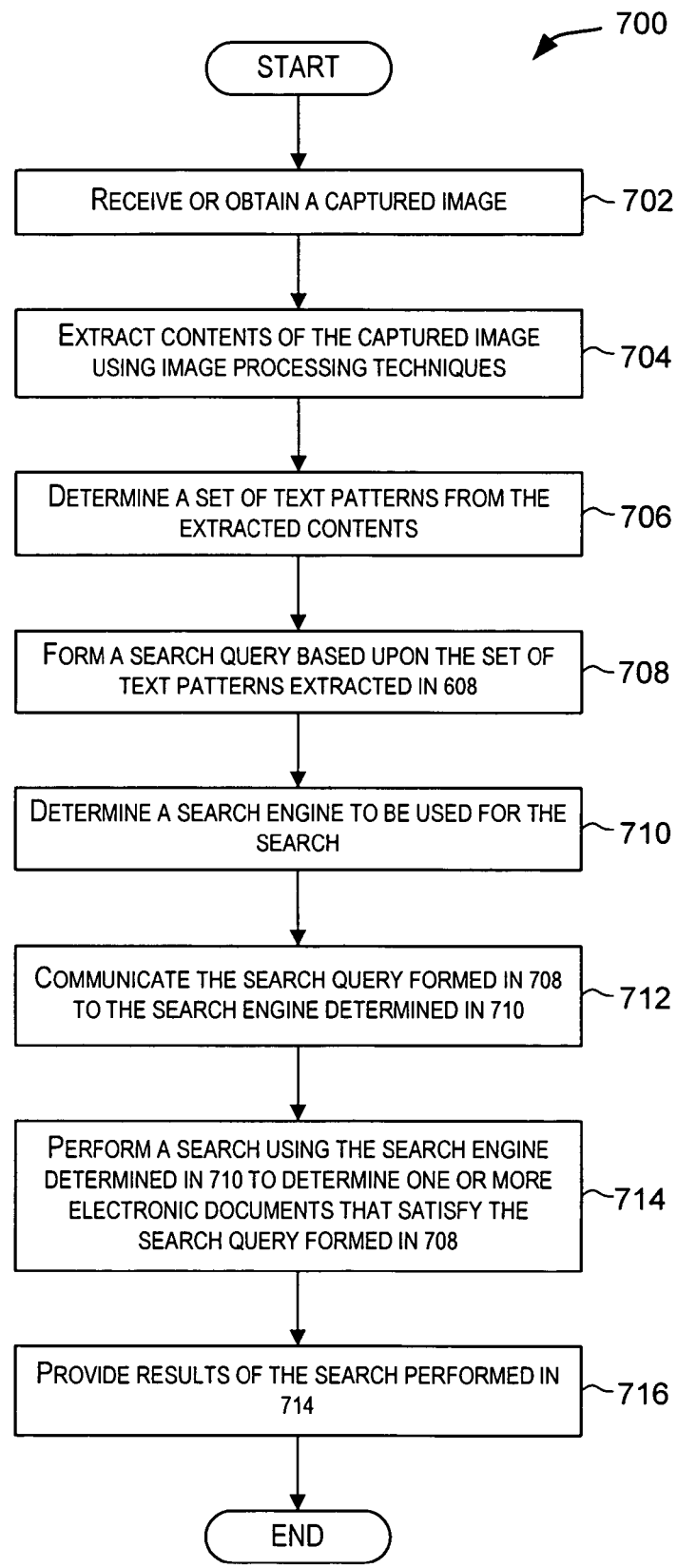
FIG. 7 is a simplified high-level flowchart depicting a method of retrieving an electronic document based upon a captured image using a selected search engine according to an embodiment of the present invention.

As shown in FIG. 1 and described above, several search engines may be available for performing the search. Different techniques may be used to determine the one or more search engines to be used for performing the search from the several available search engines. FIG. 7 is a simplified high-level flowchart 700 depicting a method of retrieving an electronic document based upon a captured image using selected one or more search engines according to an embodiment of the present invention. The method depicted in FIG. 7 may be performed by software code modules or instructions executed by a processor, hardware modules, or combinations thereof. Flowchart 700 depicted in FIG. 7 is merely illustrative of an embodiment of the present invention and is not intended to limit the scope of the present invention. Other variations, modifications, and alternatives are also within the scope of the present invention. The method depicted in FIG. 7 may be adapted to work with different implementation constraints. The processing depicted in FIG. 7 may be performed by the image capture device and/or a server using a search engine.

As depicted in FIG. 7, processing is initiated upon receiving or obtaining a captured image (step 702). One or more image processing techniques such as OCR techniques are then applied to the captured image to extract contents (or portions thereof) of the captured image (step 704). A set of text patterns is then determined from the contents extracted in step 704 (step 706). A search query is then formed using the text patterns or a subset of the text patterns determine in 706 (step 708).

A search engine (or multiple search engines) is then selected for performing the search (step 710). The search engine may be selected from multiple search engines that are available for performing the search. Various criteria may be used for determining which search engine to use. In one embodiment, the location (e.g., geographical location) of the user may be used to automatically select the search engine to be used. For example, a search engine that is proximal to the location of the user may be preferred to search engines that are further away. In this manner, local documents provided by the local search engine may be provided to the user preferentially over other documents.

In another embodiment, a list of available search engines may be displayed to the user and the user may then select one or more search engines to be used. Various technologies such as multicast Domain Name Service (DNS), Universal Plug and Play (UPnP), etc. may be used to detect search engine servers. These technologies can be implemented using wireless networking methods and can be implemented in a secure manner.

In another embodiment, the user may be allowed to designate one or more search engines to be used for searching. In yet another embodiment, a search engine may be selected based upon costs associated with the searching. For example, a search engine performing the cheapest search may be selected. Various other criteria may be used for selecting a search engine to perform the search.

A search engine may also be selected based upon the context of the search to be performed and the documents to be searched. For example, if documents related to an entity such as a business, an office, a government agency, etc. are to be searched, then a search engine provided by that entity may be selected in 710.

The search query formed in 708 is then communicated to the search engine determined in 710 (step 712). A search is performed by the search engine determined in 710 using the search query formed in 708 (step 714). Results of the search are then communicated from the search engine to a recipient (step 716). The recipient may be a person, a system, an application, or some other entity. For example, the search results may be communicated to a user of the image capture device that was used to capture the image received in 702. Various techniques may be used to provide the search results to the user. The documents retrieved by the search may be communicated to the image capture device used by the user to capture the image that formed the input for the search. The one or more documents retrieved by the search may also be delivered to other destinations.

In certain embodiments, search engines may be selected and used according to a tiered technique. For example, a first search engine may be selected during a first pass of the processing, followed by a second search engine during a second pass, and so on. In this manner, several search engines may be used to perform the searches. The search results from the various search engines may then be gathered and provided to the user. In this manner electronic documents that are not accessible to one search engine may be searched by another search engine. This technique may also be used if satisfactory search results are not obtained from a search engine thereby requiring another search engine to be used. If a single document must be chosen as the result of a search, and multiple search engines have candidate documents, a priority ranking of search engines may be used to select documents of one search engine over documents from a different search engine.

The processing depicted in FIG. 7 and described above may be illustrated with the following example. Consider a user in a shopping mall. Upon entering a shop, the user sees a brochure for an object sold by the shop. The user may snap a picture of a page of the brochure. Based upon the location of the user and where the picture is taken, a search engine provided by the shop may be selected as the search engine to be used (i.e., the search engine that is geographically proximal to the user is selected). The captured image may be wirelessly communicated to a server provided by the shop that uses the search engine of the shop. The shop search engine may then search and retrieve an electronic copy of the brochure (or any other document related to the object such as a price list, etc.) and communicate the electronic copy to the user wirelessly.

As another example, a doctor's office may be configured to provide health related information to persons in the doctor's waiting room. The doctor's office may provide a search engine that is configured to provide the health related documents to the user in response to an image provided by the user. The image may be for example of some literature kept in the doctor's office. A business might provide authenticated search access to its employees to obtain electronic documents from documents stored by a document management system used by the business in response to receiving images of the documents or portions thereof.

Figure 8:
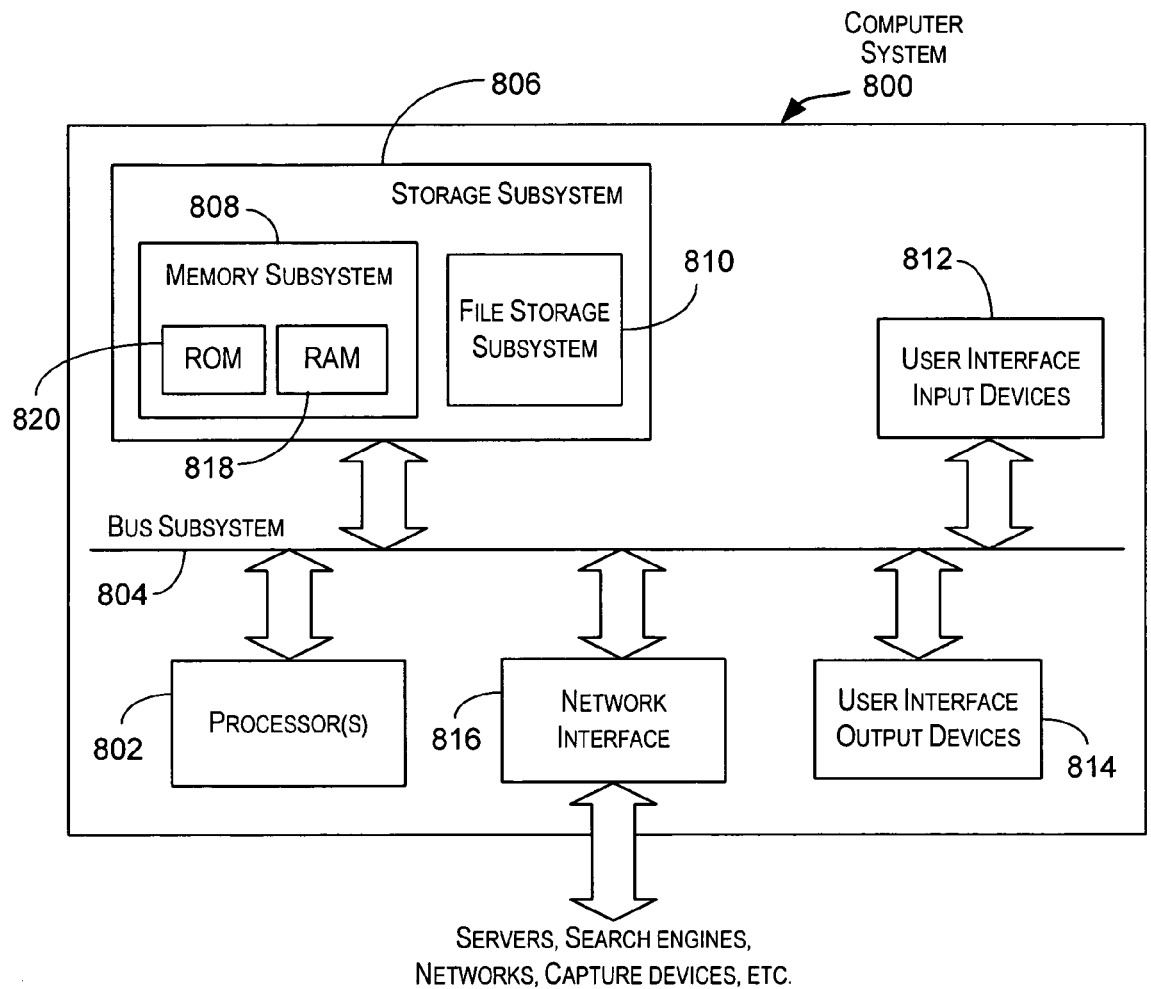
FIG. 8 is a simplified block diagram of a computer system that may be used to practice an embodiment of the present invention.

FIG. 8 is a simplified block diagram of a computer system 800 that may be used to practice an embodiment of the present invention. As shown in FIG. 8, computer system 800 includes a processor 802 that communicates with a number of peripheral devices via a bus subsystem 804. These peripheral devices may include a storage subsystem 806, comprising a memory subsystem 808 and a file storage subsystem 810, user interface input devices 812, user interface output devices 814, and a network interface subsystem 816.

Bus subsystem 804 provides a mechanism for letting the various components and subsystems of computer system 800 communicate with each other as intended. Although bus subsystem 804 is shown schematically as a single bus, alternative embodiments of the bus subsystem may utilize multiple busses.

Network interface subsystem 816 provides an interface to other computer systems including various servers, search engines, networks, and capture devices. Network interface subsystem 816 serves as an interface for receiving data from and transmitting data to other systems from computer system 800.

User interface input devices 812 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 800.

User interface output devices 814 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 800. User interfaces according to the teachings of the present invention may be displayed by user interface output devices 814.

Storage subsystem 806 may be configured to store the basic programming and data constructs that provide the functionality of the present invention. Software code modules or instructions that provide the functionality of the present invention may be stored in storage subsystem 806. These software code modules or instructions may be executed by processor(s) 802. Storage subsystem 806 may also provide a repository for storing data used in accordance with the present invention. Storage subsystem 806 may comprise memory subsystem 808 and file/disk storage subsystem 810.

Memory subsystem 808 may include a number of memories including a main random access memory (RAM) 818 for storage of instructions and data during program execution and a read only memory (ROM) 820 in which fixed instructions are stored. File storage subsystem 810 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 800 can be of various types including a personal computer, a portable computer, a workstation, a network computer, a mobile phone, a PDA, a mainframe, a kiosk, a camera, an image capture device, or any other data processing system. Due to the ever-changing nature of computers and networks, the description of computer system 800 depicted in FIG. 8 is intended only as a specific example for purposes of illustrating the preferred embodiment of the computer system. Many other configurations having more or fewer components than the system depicted in FIG. 8 are possible.

According to an embodiment of the present invention, service providers may provide search services that may be used by users to retrieve electronic documents in response to images provided by the users. A service provider may provide servers that are configured to receive images from a user, process the images, perform searches based upon the images, and communicate the electronic documents found by the searches to the user. A user may be charged a fee to use the search services provided by the service provider. Various fee structures may be used. For example, in one embodiment, a fee may be charged for each electronic document that is found by the search and downloaded by the user. Advertisements and other marketing material may also be provided as part of the document download. As part of the search services, the search service providers may provide access to electronic documents that normally would not be accessible to the user.

Although specific embodiments of the invention have been described, various modifications, alterations, alternative constructions, and equivalents are also encompassed within the scope of the invention. For example, embodiments of the present invention described above perform searches using text patterns. In alternative embodiments, other contents of the captured image such as images contained within the captured image, other objects within the captured image (e.g., multimedia objects), etc. may also be used to perform the searches. The described invention is not restricted to operation within certain specific data processing environments, but is free to operate within a plurality of data processing environments.

Additionally, although the present invention has been described using a particular series of transactions and steps, it should be apparent to those skilled in the art that the scope of the present invention is not limited to the described series of transactions and steps. For example, various combinations of the processing depicted in FIGS. 2, 4, 5, 6, and 7 may be used in different embodiments of the present invention.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of retrieving electronic documents, the method comprising:
   receiving an image;
   extracting, by an image processing system, contents of the image to generate extracted contents;
   determining a plurality of text strings from the extracted contents of the image;
   assigning a confidence value to each of the plurality of text strings, wherein the confidence value is indicative of a likelihood that the image processing system has correctly determined content of each of the plurality of text strings, wherein assigning the confidence value comprises:
      determining whether the image has noise, the presence of noise being indicative of a low quality image;
      if the image has noise, assigning a first confidence value to each of the plurality of text strings; and
      if the image does not have noise, assigning a second confidence value to each of the plurality of text strings, wherein the second confidence value is greater than the first confidence value;
   determining at least a first text string and a second text string from among the plurality of text strings based at least in part on the confidence value for each of the first and the second text strings;
   forming a search query by conjoining the first text string and the second text string to produce a third text string as the search query, the third text string comprising the first string and the second string;
   searching a plurality of electronic documents to identify a first electronic document that satisfies the search query; and
   communicating the first electronic document to a recipient.

2. The method of claim 1 wherein
   extracting the contents of the image comprises
      using an image processing technique to extract the contents of the image.

3. The method of claim 1 wherein the step of determining at least a first text string and a second text string includes identify text using a lexicon, wherein text that belong to the lexicon are included in the first and second text strings, wherein at least one text string from the extracted contents not belonging to the lexicon is excluded from the first and second text strings.

4. The method of claim 1 wherein communicating the first electronic document to the recipient comprises communicating the first electronic document to an image capture device.

5. The method of claim 4 wherein the image capture device is a mobile phone equipped with a camera and the first electronic document is communicated to the mobile phone via a wireless network.

6. The method of claim 1 wherein communicating the first electronic document to the recipient comprises communicating the first electronic document via an email to an electronic mailing address.

7. The method of claim 1 wherein the recipient is a user of an image capture device.

8. The method of claim 1 further comprising determining a first search engine for performing the searching, and wherein searching the plurality of electronic documents comprises searching the plurality of documents using the first search engine.

9. The method of claim 8 wherein determining the first search engine comprises:
   determining a location of a user of an image capture device that captured and sent the image; and
   selecting the first search engine from a plurality of search engines based upon the location.

10. The method of claim 9 wherein the selecting comprises selecting a search engine that is located proximal to the location.

11. The method of claim 1 wherein the image is an image of a portion of a paper document and the first electronic document is an electronic version of the paper document.

12. A method of retrieving electronic documents, the method comprising:
   receiving a first image;
   extracting, by an image processing system, strings of text from the first image;
   assigning a confidence value to each of the extracted text strings, the confidence value being indicative of a likelihood that the image processing system correctly identified content of each of the text strings and wherein assigning the confidence value further comprises:
      determining whether the first image has noise, the presence of noise being indicative of a low quality image;
      if the first image has noise, assigning a first confidence value to each of the extracted text strings; and
      if the first image does not have noise, assigning a second confidence value to each of the extracted text strings, wherein the second confidence value is greater than the first confidence value;
   forming a search query comprising alphanumeric characters from at least one of the extracted strings, the at least one extracted text string being selected based at least in part on the confidence value of the at least one text string;
   performing a search to identify a first set of electronic documents comprising one or more electronic documents that include the alphanumeric characters in the search query;
   when the number of electronic documents in the first set of electronic documents is less than a predefined number, then:
      receiving a second image;
      extracting strings of text from the second image;
      forming a second search query comprising alphanumeric characters of the extracted strings of text from the second image; and
      performing a search to identify a second set of electronic documents comprising one or more electronic documents that include the strings of text comprising the second search query; and
   communicating the second set of electronic documents to a recipient.

13. The method of claim 12 wherein the predefined number is set to one.

14. A method of retrieving electronic documents, the method comprising:
   receiving a first image;
   extracting, by an image processing system, contents of the first image;
   assigning a confidence value to the extracted contents, wherein the confidence value is indicative of a likelihood that the image processing system has correctly identified the contents of the first image, wherein assigning the confidence value further comprises:
      determining whether the first image has noise, the presence of noise being indicative of a low quality image;
      if the first image has noise, assigning a first confidence value to the extracted contents; and if the first image does not have noise, assigning a second confidence value to the extracted contents, wherein the second confidence value is greater than the first confidence value;

forming a search query comprising alphanumeric characters of the extracted contents of the first image based at least in part on the confidence value;

searching a plurality of electronic documents using the search query formed based upon the extracted contents of the first image;

(a) requesting another image if the search does not identify precisely one electronic document;

(b) receiving another image;

(c) extracting contents of the another image;

(d) forming a second search query comprising alphanumeric characters of the extracted contents of the another image; and (e) searching a plurality of electronic documents using the second search query;

repeating (a), (b), (c), (d), and (e) until the search identifies precisely one electronic document that satisfies the search query; and communicating the precisely one electronic document to a recipient.

15. A method of retrieving electronic documents, the method comprising:

receiving an image;

extracting contents of the image using an image processing technique;

determining a plurality of text strings from the extracted contents of the image;

assigning a confidence value to each of the plurality of text strings, the confidence value being indicative of a likelihood that the image processing technique has correctly identified content of each of the plurality of text strings, wherein assigning the confidence value further comprises:

determining whether the image has noise, the presence of noise being indicative of a low quality image;

if the image has noise, assigning a first confidence value to each of the plurality of text strings; and if the image does not have noise, assigning a second confidence value to each of the plurality of text strings, wherein the second confidence value is greater than the first confidence value;

selecting a first text string and a second text string from the plurality of text strings, based at least in part on the confidence value of each of the first and the second text strings, such that the plurality of text strings comprises at least one text string that is not included among the first text string and a second text string;

forming a search query by conjoining the first text string and the second text string to produce a third text string as the search query, the third text string comprising the first string and the second string;

searching a plurality of electronic documents to identify a first electronic document that satisfies the search query; and communicating the first electronic document to a recipient.

16. A method of retrieving electronic documents, the method comprising:

receiving an image;

extracting a plurality of text patterns from the received image using an image processing technique;

assigning a confidence value to each of the plurality of text patterns, wherein the confidence value corresponds to a likelihood that content of each of the plurality of text patterns was identified correctly, wherein assigning the confidence value comprises:

determining whether the image has noise, the presence of noise being indicative of a low quality image;

if the image has noise, assigning a first confidence value to each of the plurality of text patterns; and if the image does not have noise, assigning a second confidence value to each of the plurality of text patterns, wherein the second confidence value is greater than the first confidence value;

selecting a first subset of text patterns from the plurality of text patterns, based at least in part on the confidence value of the first subset of text patterns, such that the plurality of text patterns comprises at least one text pattern that is not included in the first subset;

forming a search query comprising alphanumeric characters of the first subset of text patterns;

searching a plurality of electronic documents using the search query in an attempt to identify at least one electronic document from among the plurality of electronic documents;

determining that the search performed using the first subset of text patterns does not identify said at least one electronic document, and in response thereto:

selecting a second subset of text patterns from the plurality of text patterns obtained from the received image;

forming a second search query comprising alphanumeric characters of the second subset of text patterns;

searching the plurality of electronic documents using the second search query; and communicating one or more electronic documents identified from among the plurality of electronic documents by the search performed using the second subset of text patterns to a recipient.

17. A system for retrieving electronic documents, the system comprising:

a memory configured to store an image;

a processor coupled to the memory, the processor configured to:

extract contents of the image to generate extracted contents;

determine a plurality of text strings from the extracted contents;

assign a confidence value to each of the plurality of text strings, the confidence value being indicative of a likelihood that the processor correctly identified content of each of the plurality of text strings, wherein to assign the confidence value, the processor is further configured to:

determine whether the image has noise, the presence of noise being indicative of a low quality image;

if the image has noise, assign a first confidence value to each of the plurality of text strings; and if the image does not have noise, assign a second confidence value to each of the plurality of text strings, wherein the second confidence value is greater than the first confidence value;

determine at least a first text string and a second text string from among the plurality of text strings, based at least in part on the confidence value for each of the first and the second text strings;

form a search query by conjoining the first text string and the second text string to produce a third text string as the search query, the third text string comprising the first string and the second string;

search a plurality of electronic documents to identify a first electronic document that satisfies the search query; and communicate the first electronic document to a recipient.

18. The system of claim 17 wherein the processor is configured to extract the contents of the image by using an image processing technique to extract the contents of the image.

19. The system of claim 17 wherein the processor is configured to communicate the first electronic document to an image capture device.

20. The system of claim 19 wherein the image capture device is a mobile phone equipped with a camera and the processor is configured to communicate the first electronic document to the mobile phone via a wireless network.

21. The system of claim 17 wherein the processor is configured to communicate the first electronic document via an email to an electronic mailing address.

22. The system of claim 17 wherein the processor is configured to communicate the first electronic document to a user of an image capture device.

23. The system of claim 17 wherein the processor is configured to determine a first search engine for performing the searching, and to search the plurality of documents using the first search engine.

24. The system of claim 23 wherein the processor is configured to determine the first search engine by:
 determining a location of a user of an image capture device that captured and sent the image; and
 selecting the first search engine from a plurality of search engines based upon the location.

25. The system of claim 24 wherein the selecting comprises selecting a search engine that is located proximal to the location.

26. The system of claim 17 wherein the image is an image of a portion of a paper document and the first electronic document is an electronic version of the paper document.

27. A non-transitory computer-readable storage medium storing a plurality of instructions for controlling a data processor to retrieve electronic documents, the plurality of instructions comprising:
 instructions that cause the data processor to receive an image;
 instructions that cause the data processor to extract contents of the image to generate extracted contents;
 instructions that cause the data processor to determine a plurality of text strings from the extracted contents;
 instructions that cause the processor to determine if the image has noise;
 instructions that cause the processor to assign a first confidence value to the plurality of text strings if the image has noise;
 instructions that cause the processor to assign a second confidence value to the plurality of text strings if the image does not have noise, wherein the second confidence value is greater than the first confidence value and wherein
 a confidence value is indicative of a likelihood that the processor correctly identified content of each of the plurality of text strings;
 instructions that cause the data processor to determine at least a first text string and a second text string from among the plurality of text strings, based at least in part on the confidence value for each of the first and the second text strings;
 instructions that cause the data processor to form a search query by conjoining the first text string and the second text string to produce a third text string as the search query, the third text string comprising the first string and the second string;
 instructions that cause the data processor to search a plurality of electronic documents to identify a first electronic document that satisfies the search query; and
 instructions that cause the data processor to communicate the first electronic document to a recipient.

28. A system for retrieving electronic documents, the system comprising:
 a memory configured to store a first image; and
 a processor coupled to the memory, the processor configured to:
  extract contents of the first image;
  assign a confidence value to the extracted contents, the confidence value being indicative of whether the contents of the first image were identified correctly and being based on quality of the first image, wherein to assign the confidence value the processor is further configured to:
   determine whether the first image has noise, the presence of noise being indicative of a low quality image;
   if the first image has noise, assign a first confidence value to the extracted contents; and
   if the first image does not have noise, assign a second confidence value to the extracted contents, wherein the second confidence value is greater than the first confidence value;
  form a search query based at least in part on the confidence value of the extracted contents of the first image;
  perform a search to identify a first set of electronic documents comprising one or more electronic documents that satisfy the search query;
  communicate the first set of electronic documents to a recipient when the number of electronic documents in the first set of electronic documents is greater than or equal to a predefined number;
  when the number of electronic documents in the first set of electronic documents is less than a predefined number, then:
   receive a second image;
   extract contents of the second image;
   form a second search query based upon the extracted contents of the second image;
   perform a search to identify a second set of electronic documents comprising one or more electronic documents that satisfy the search query based upon the extracted contents of the second image; and
   communicate the second set of electronic documents to the recipient.

29. A system for retrieving electronic documents, the system comprising:
 a memory configured to store a first image; and
 a processor coupled to the memory, the processor configured to:
  extract contents of the first image;
  determine whether the first image has noise, the presence of noise being indicative of a low quality image;
  assign a first confidence value to the extracted contents if the first image has noise; and
  assign a second confidence value to the extracted contents if the first image does not have noise, the second confidence value being greater than the first confidence value, a confidence value being indicative of whether the contents of the first image were identified correctly;

form a search query based at least in part on the confidence value of the extracted contents of the first image;
perform a search using the search query;
(a) request another image if the search does not identify precisely one electronic document;
(b) receive another image;
(c) extract contents of the other image;
(d) form a second search query based upon the extracted contents of the other image; and
(e) perform a second search using the second search query formed based upon the extracted contents of the other image;
repeat (a), (b), (c), (d), and (e) until the search identifies precisely one electronic document that satisfies the second search query; and
communicate the precisely one electronic document to a recipient.

30. A system for retrieving electronic documents, the system comprising:
a memory configured to store an image; and
a processor coupled to the memory, the processor configured to:
extract contents of the image using an image processing technique;
determine a plurality of text strings from the extracted contents of the image;
assign a confidence value to each of the plurality of text strings, the confidence value being indicative of likelihood that the image processing technique correctly identified content of each of the plurality of text strings, wherein to assign the confidence value the processor is further configured to:
determine whether the image has noise, the presence of noise being indicative of a low quality image;
if the image has noise, assign a first confidence value to the plurality of text strings; and
if the first image does not have noise, assign a second confidence value to the plurality of text strings, wherein the second confidence value is greater than the first confidence value;
select a first text string and a second text string from the plurality of text strings, based at least in part on the confidence value assigned to each of the first and the second text strings, such that the plurality of text strings comprises at least one text strings that is not included among the first text string and a second text string;
form a search query by conjoining the first text string and the second text string to produce a third text string as the search query, the third text string comprising the first string and the second string;
search a plurality of electronic documents to identify a first electronic document that satisfies the search query; and
communicate the first electronic document to a recipient.

31. A system for retrieving electronic documents, the system comprising:
a memory configured to store a captured image; and
a processor coupled to the memory, the processor configured to:
extract a plurality of text patterns from the received image using an image processing technique;
assign a confidence value to each of the plurality of text patterns based on the quality of the image, the confidence value being indicative of a likelihood that the processor correctly identified content of each of the plurality of text patterns, wherein to assign the confidence value the processor is further configured to:
determine whether the image has noise, the presence of noise being indicative of a low quality image;
if the image has noise, assign a first confidence value to each of the plurality of text patterns; and
if the image has no noise, assign a second confidence value to each of the plurality of text patterns, wherein the second confidence value is greater than the first confidence value;
select a first subset of text patterns from the plurality of text patterns, based at least in part on the confidence value of the first subset of text patterns, such that the plurality of text patterns comprises at least one text pattern that is not included in the first subset of text patterns;
form a search query based upon the first subset of text patterns;
search a plurality of electronic documents using the search query in an attempt to identify at least one electronic document from among the plurality of electronic documents;
select a second subset of text patterns from the plurality of text patterns obtained from the received image if the search performed using the first subset of text patterns does not identify at least one electronic document;
form a second search query based upon the second subset of text patterns; and
search the plurality of documents using the second search query; and
communicate one or more electronic documents identified from among the plurality of electronic documents by the search performed using the second search query to a recipient.

\* \* \* \* \*